US009537654B2

(12) United States Patent
Botero Montano

(10) Patent No.: US 9,537,654 B2
(45) Date of Patent: Jan. 3, 2017

(54) BIOMETRIC VALIDATION METHOD AND BIOMETRIC TERMINAL

(71) Applicant: IDENTICA S.A., Bogota, DC (CO)

(72) Inventor: Rodrigo Botero Montano, Bogota (CO)

(73) Assignee: IDENTICA S.A., Bogota, DC (CO)

( * ) Notice: Subject to any disclaimer, the term of this patent is extended or adjusted under 35 U.S.C. 154(b) by 0 days.

(21) Appl. No.: 14/411,672

(22) PCT Filed: Jun. 21, 2013

(86) PCT No.: PCT/CO2013/000003
§ 371 (c)(1),
(2) Date: May 26, 2015

(87) PCT Pub. No.: WO2014/000717
PCT Pub. Date: Jan. 3, 2014

(65) Prior Publication Data
US 2015/0295709 A1   Oct. 15, 2015

(30) Foreign Application Priority Data

Jun. 29, 2012 (CO) .................................. 12109326

(51) Int. Cl.
*G06F 21/32* (2013.01)
*H04L 9/08* (2006.01)
(Continued)

(52) U.S. Cl.
CPC ............ *H04L 9/0863* (2013.01); *G06F 21/31* (2013.01); *G06F 21/32* (2013.01); *G06Q 20/322* (2013.01);
(Continued)

(58) Field of Classification Search
CPC ........................... H04L 63/0861; H04L 9/0866
See application file for complete search history.

(56) References Cited

U.S. PATENT DOCUMENTS 4,555,805 A * 11/1985 Talbot ...................... H04K 1/02
380/247
7,961,917 B2 * 6/2011 Black .................. G06F 3/03545
382/116
(Continued)

OTHER PUBLICATIONS

A. Figuera Gonzalez, International Search Report cited in PCT Application No. CO2013/000003, Dec. 4, 2013, 2 pages.

*Primary Examiner* — Josnel Jeudy
(74) *Attorney, Agent, or Firm* — Arent Fox LLP

(57) ABSTRACT

The present invention belongs to the field of Biometry. It discloses useful technology and equipment to make remote processes of fingerprint recognition and identity authentication, based on the processing and validation of biometric data that is captured in a recipient device, controlled by a center that acts like the network controller, linked as well to a process that verifies and ensures the required identity.

The referred process enables the application, in a simple and economic way, of Remote Biometric Authentication processes to economic activities currently beyond this technology, in which the physical presence of the person that intends being identifying is usually required. The invention overcomes the referred limitation, and makes this technology applicable to capable of commercial processes, of authorization and validation of banking and compatible payments, and medical care, social security and social services, among others.

11 Claims, 8 Drawing Sheets

(51) Int. Cl.
  *G06Q 20/32* (2012.01)
  *G06Q 20/40* (2012.01)
  *G06F 21/31* (2013.01)

(52) U.S. Cl.
  CPC ...... *G06Q 20/3255* (2013.01); *G06Q 20/4012* (2013.01); *G06Q 20/40145* (2013.01); *H04L 2209/24* (2013.01)

(56) References Cited

U.S. PATENT DOCUMENTS

| | | | |
|---|---|---|---|
| 2001/0032096 A1* | 10/2001 | Uchida | G06Q 10/08 382/115 |
| 2004/0005087 A1* | 1/2004 | Hillhouse | G06F 21/32 382/125 |
| 2006/0242423 A1* | 10/2006 | Kussmaul | G06F 21/32 713/182 |
| 2007/0050636 A1* | 3/2007 | Menczel | G06K 9/00885 713/186 |
| 2007/0092114 A1 | 4/2007 | Ritter et al. | |
| 2007/0288320 A1 | 12/2007 | Cooper et al. | |
| 2008/0028230 A1* | 1/2008 | Shatford | H04L 9/3231 713/186 |
| 2008/0046366 A1 | 2/2008 | Bemmel et al. | |
| 2013/0101119 A1* | 4/2013 | Nordholt | H04L 9/083 380/256 |

* cited by examiner

BIOMETRIC VALIDATION METHOD AND BIOMETRIC TERMINAL

DESCRIPTION OF THE INVENTION

In the recent time, there has been a growing need to identify and authenticate individuals, considering the increase on identity theft cases and frauds in elections, health and social security systems, and public and private commercial and banking transactions. Moreover, identification and authentication processes must be particularly accurate for applications such as national security, law enforcement, e-commerce, access control and privacy protection, among others.

In the financial sector, for example, all kinds of efforts have been made so that customers continuously change the passwords used in the transactions, in order to mitigate the fraud caused by phishing.

There are currently several identification systems using biometric information. First of all, the matter described in patent document US2006/0120577, incorporated herein as reference to prior art, discloses a device applicable to the process of identification or authentication of an individual, using biometric information (e.g., fingerprints, voice, iris, face, retina, configuration of hands, signature, etc.) to be captured as image or biometric information constituting data in series of time. These systems require hardware that codifies and encrypts the information captured from biometric information with sectors that read, convert and extract the information to Validate user's data or identity.

The use of biometry from fingerprint information to identify and authenticate humans is a highly accurate proven method, widely documented in the state of the art. U.S. Pat. No. 6,954,553 describes a personal authentication system using fingerprint information. This system includes a section to extract the information of the fingerprint from the image of the fingerprint, a section of extraction of fingerprint information patterns extracted by using the pattern of the fingerprint image; a matching priority definition section for outputting a matching priority for each of matching data groups classified in accordance with a registrant fingerprint pattern. These systems have allowed that even when a perfect match does not exist between the pattern of the fingerprint of the person to be authenticated and registered patterns, a person can be authenticated without fail and the amount of computation can be omitted significantly. Nevertheless, it is common that this concept requires specific knowledge of each hardware or software manufacturer regarding the use offered by the biometrical authentication and that a standard common system is not presented for installation.

A similar case is PCT/WO 2008/098357, referred to a method to identify the carrier of a fingerprint, which comprises deriving a code from the individual's index finger and an associated code that matches with the image of the individual's fingerprint. For developing such processes, databases are essential as there is access to records being associated to an identity and a code of the respective index finger, providing a respective matching code until it actually determines that the code matches with its respective donor. This allows generating a conclusive signal that the owner of the fingerprint image has been identified and associated with the particular record. In this case, the fingerprint is recognized transforming the image into patterns that are recognized by the computer, which correlates the details and sends them to be combined with the database that allows matching the codes and offering the identity of the person for validation.

Additionally, it has been observed in the state of the art that the current authentication method from biometric data consists basically of integrating the captor fingerprint device directly to the hardware requiring biometry, by installing additional software and cables (e.g., USB). Such integration is certainly achieved by the development of a device controlling software (driver) in the apparatus that controls the biometric device (PC, Data-phone, ATM, etc.). Once the Driver is available, it is required to develop a specific application that startups the biometric device for capturing the fingerprint, the software that codifies the same, and prepares it to be transferred by the specific protocol used in each case. This application and driver are required individually for each client claiming the same (PC, Data-phone, ATM, etc.), which makes necessary using different solutions from different manufacturers.

Furthermore, it has been observed that methods involving a device and a method to authorize an electronic transaction as described in U.S. Pat. No. 6,523,745, include a computer located in the site of the transaction, a conversion module to establish the connection between the computer located in the site of the transaction and the module that authorizes the transaction, and a connection between the conversion module and the computer in the site of the transaction. These cases, allow that information is transferred through an authorization center, but it requires specific hardware and software that converts the data in the place of the transaction, without the use of the equivalence of data in the aforementioned center using the purchaser's ID.

There are also systems that relate the authentication information with a terminal in communication with a server, as it is shown in U.S. Pat. No. 6,636,620. This server can include a computer and a database. The terminal of the client works as authorization device, while the server plays the role of an approval center. Nevertheless, this system requires additional hardware that supports specific software in the site of the client terminal, and the information is not encrypted from the digital reader device.

The present invention provides a safe and efficient system to validate the identity of customers, without the use of any additional software. In addition, it solves the need to identify and authenticate people in many common applications with a suitable speed and where delays by human intervention are at minimum or are eliminated, without sacrificing accuracy. More particularly, the invention is directed to easily provide Biometry to any process or device that can centrally place the request, regardless of who makes such request, or its hardware or software.

BRIEF DESCRIPTION OF THE INVENTION

The invention discloses a parallel network of biometrical terminals, controlled centrally in a selective way. Each biometrical Terminal is linked or "matched" in accordance with a previous allocation and distribution of operation to the electronic device or process that requires the corresponding biometrical authentication.

Accordingly, the invention is characterized by using the parallel network of biometrical terminals, controlled centrally on a selective way. Such network activates the corresponding biometrical Terminal, to provide the devices or processes with biometrical validation at any place where it is required. The validation process does not require any hardware or software intervention with the device requiring it. As a result of the Authentication, the central system delivers a positive or negative "Hit/No-Hit" output of biometrical authentication, so that the process or device keeps operating with the benefit of having the biometrical authentication.

The parallel network of biometrical authentication described by this invention manages all fingerprint capture and encryption devices called herein "IDMatch9" (FIGS. 3 and 4), designed specifically for such purpose, and activates the capture of fingerprints requested by the biometric system.

This network comprises centralized software, common in the entire network, which activates the biometric device required by each Terminal (PC, Data-phone, Automatic Teller Machine, etc.) in need of the biometrical authentication. Thus, a unique controller avoids the need of further integration system or software for each manufacturer or customer that may require the use of the biometry.

In another embodiment, the invention discloses a biometrical validation process, characterized by the fact that the request for biometrical authentication is made through a center that receives a signal with the code information that identifies a fingerprint capture and encryption device (IDmatch9) to be activated and the personal identification number (PIN) of the person to be authenticated. With this information, the request of activation is sent to the capture and encryption device of such fingerprint identified with the code, to allow the beginning of the capture and encryption process of the fingerprint from which a template or information is obtained in the IDMatch9 device.

The fingerprint information (template) is encrypted and transferred to the center that requested the same, with the personal identification number (PIN) of the person to be authenticated; the templates of reference are extracted from the corresponding database for the respective matching that allows ensuring the identity of the person identified with the PIN. Once the person has been authenticated, the center sends either a positive signal (hit) or a negative signal (not hit) of the authentication, to whoever asked for this authentication, adding the registered biographical information in the reference database.

The advantage of the invention is avoiding the need of specific developments or technical knowledge of the customer requiring biometrical validation. The validation is made controlling the fingerprint capture and encryption device in a centralized way. This central control qualifies the device with a simple activation that individually references each fingerprint capture and encryption device, according to the serial number identifying the same.

DETAILED DESCRIPTION OF THE INVENTION

The present invention will be described in a detailed form regarding the figures attached, showing the main aspects to carry out the invention.

Figure 1:
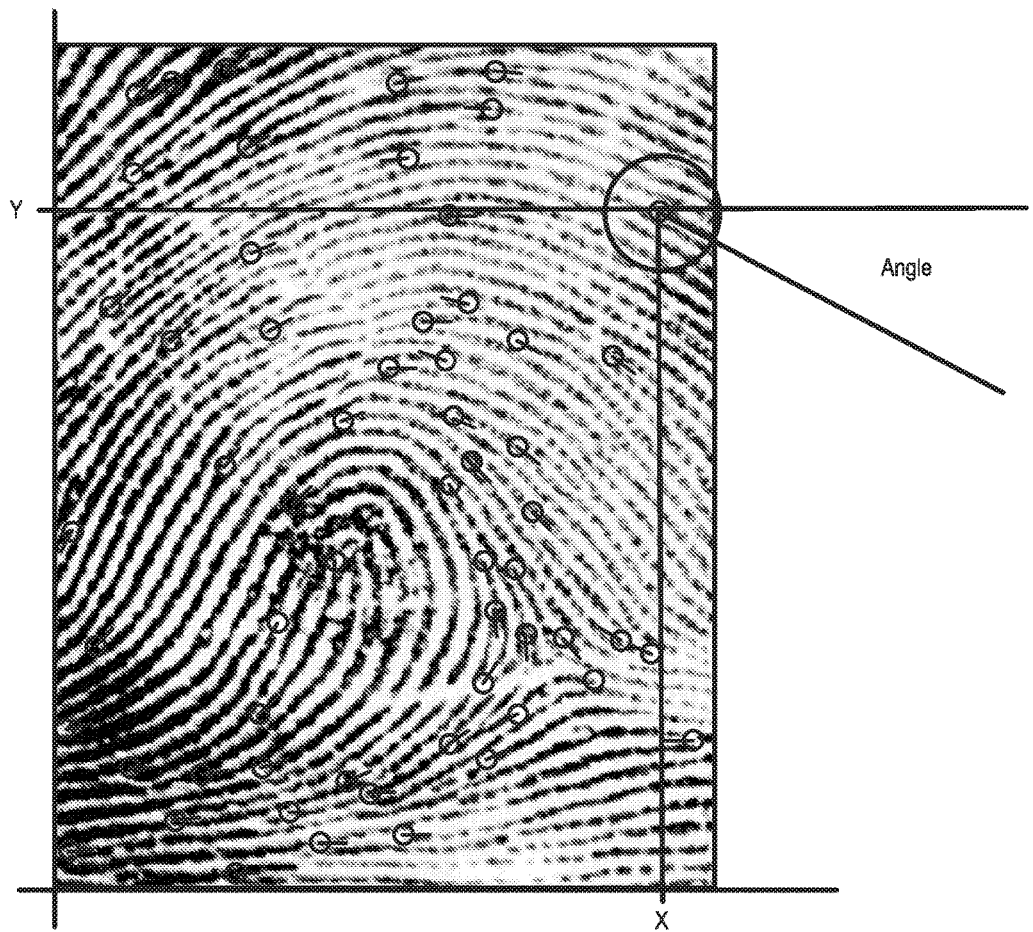
FIG. 1. Detailed illustration of a fingerprint and the process whereby the patterns of the fingerprint are obtained that conform the "template" of the fingerprint.

The invention refers to a procedure of biometrical validation, in which the request of the biometrical authentication is made through a center that receives a signal with the information of the code that identifies a fingerprint capture and encryption device to be activated, and the personal identification number (PIN) of the person to be authenticated. This information is sent with the request of activation to the fingerprint capture and encryption device identified with the code to begin the fingerprint capture and encryption process, thus obtaining the parameters of digital information or template (FIG. 1) thereof in the fingerprint capture and encryption device.

The fingerprint information (template), is encrypted and transferred to the center that requested the same, and with the personal identification number (PIN) of the person to be authenticated, the templates of reference are extracted from the respective database for the respective matching to ensure the identity of the person identified with the PIN. Once the person has been authenticated, the center sends either a positive signal (hit) or a negative signal (not hit) of the corresponding authentication to whoever asked for such authentication.

Figure 3:
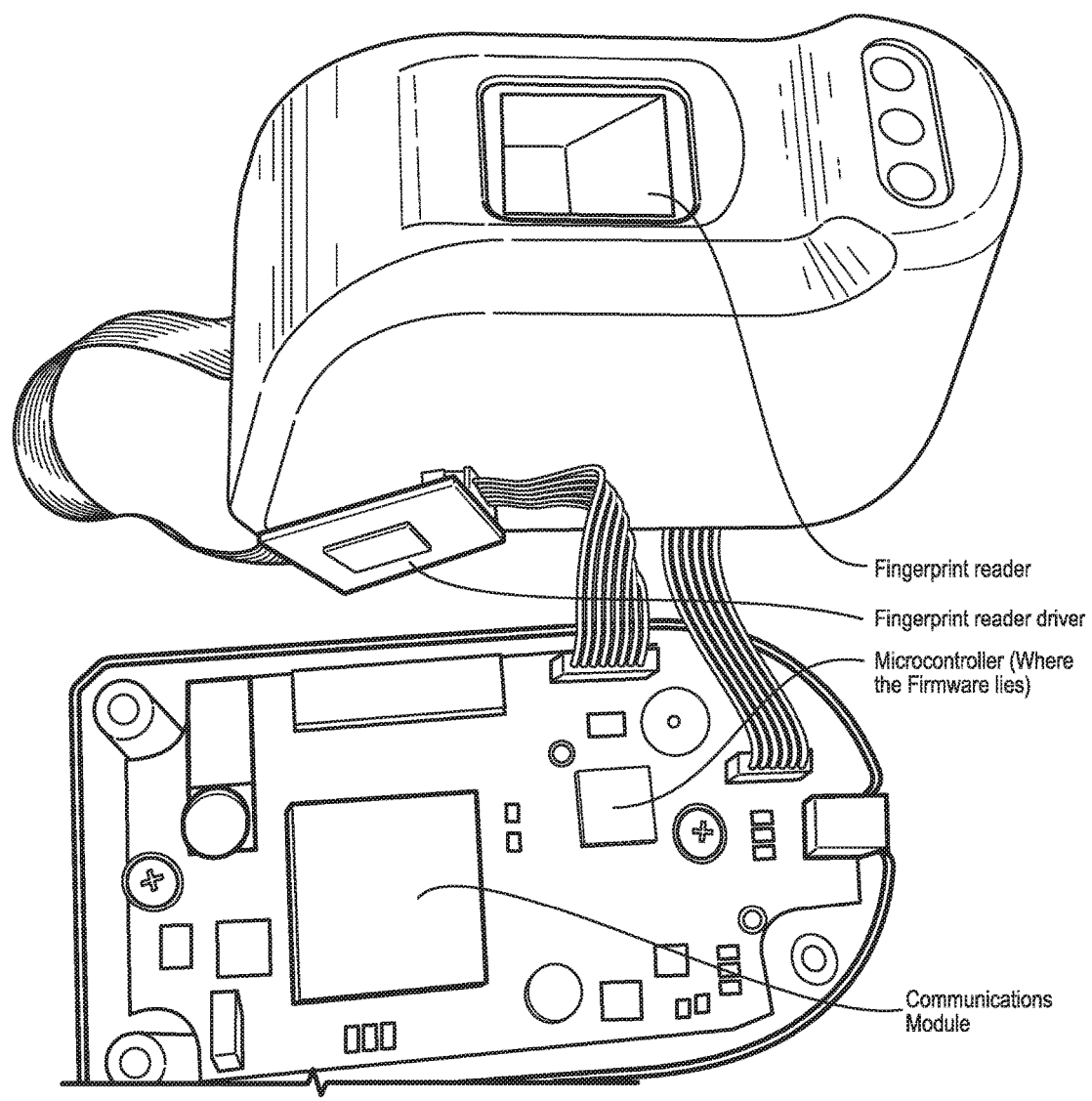
FIG. 3. Device for fingerprint reading, designed specifically for the accomplishment of the process of biometrical authentication.
Figure 4:
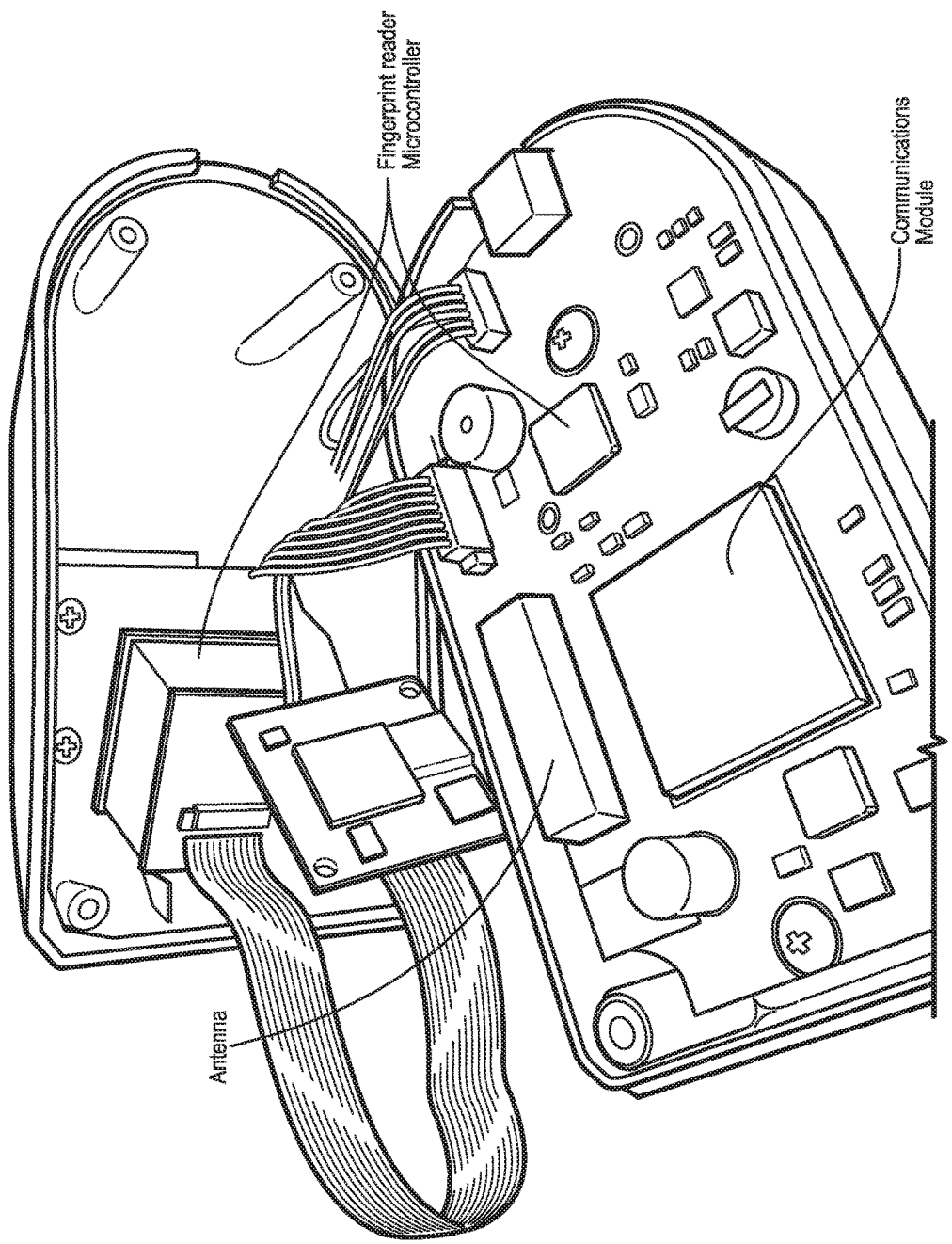
FIG. 4. Device for fingerprint reading (internal view), designed specifically for the accomplishment of the process of biometrical authentication.

The activation of the fingerprint capture with a fingerprint capture and encryption device (IDMatch9, FIGS. 3 and 4, member of the Parallel Network of Biometrical Authentication) begins by request for such service. This activation is made taking as input;

a) The ID number of the person to be biometrically authenticated, and b) The single number that identifies the biometrical Terminal required for fingerprint capture, encryption and transmission.

Figure 2:
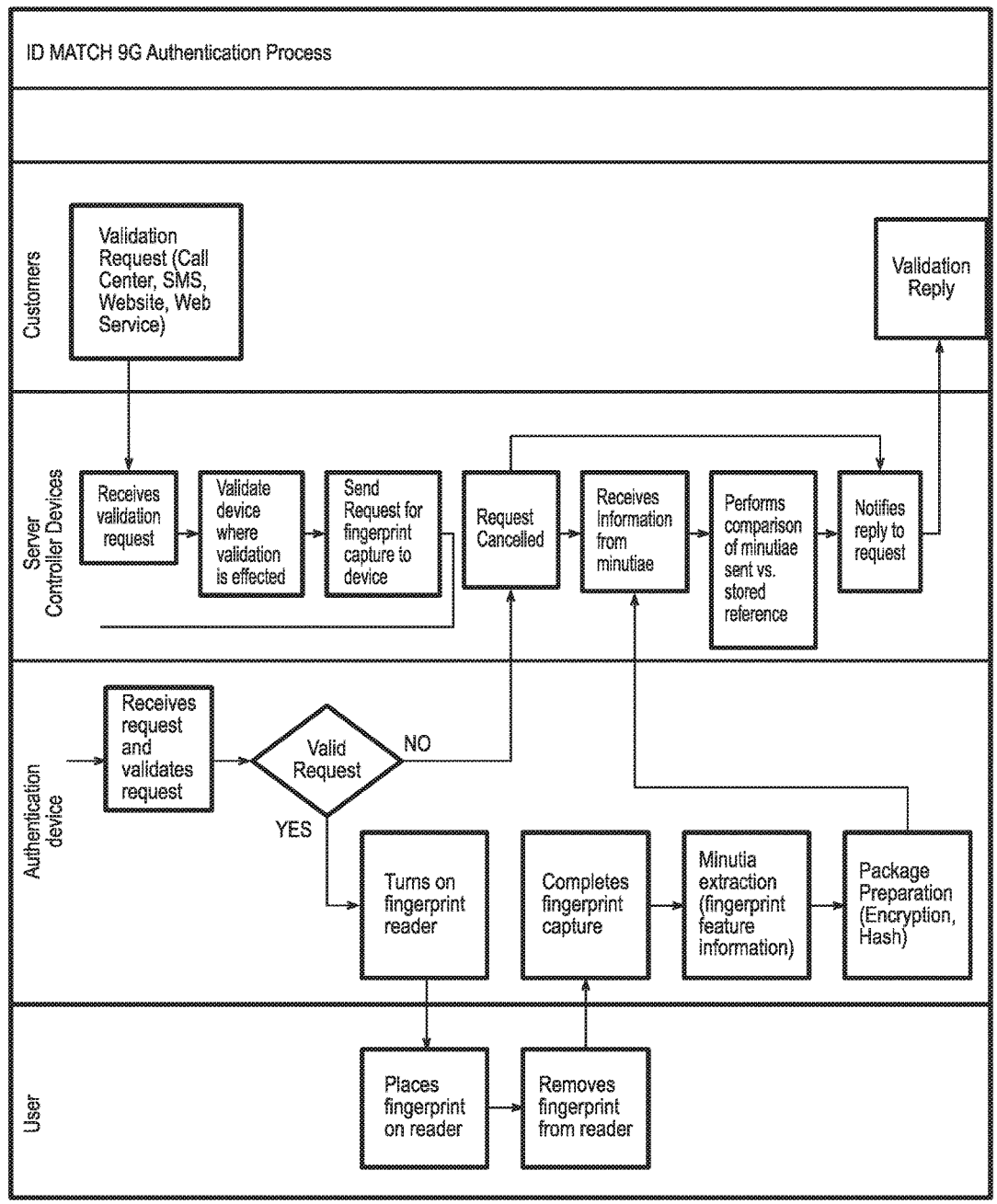
FIG. 2. Schematic diagram of the algorithm of service request used in the process of invention and the device designed for such aim.
Figure 5:
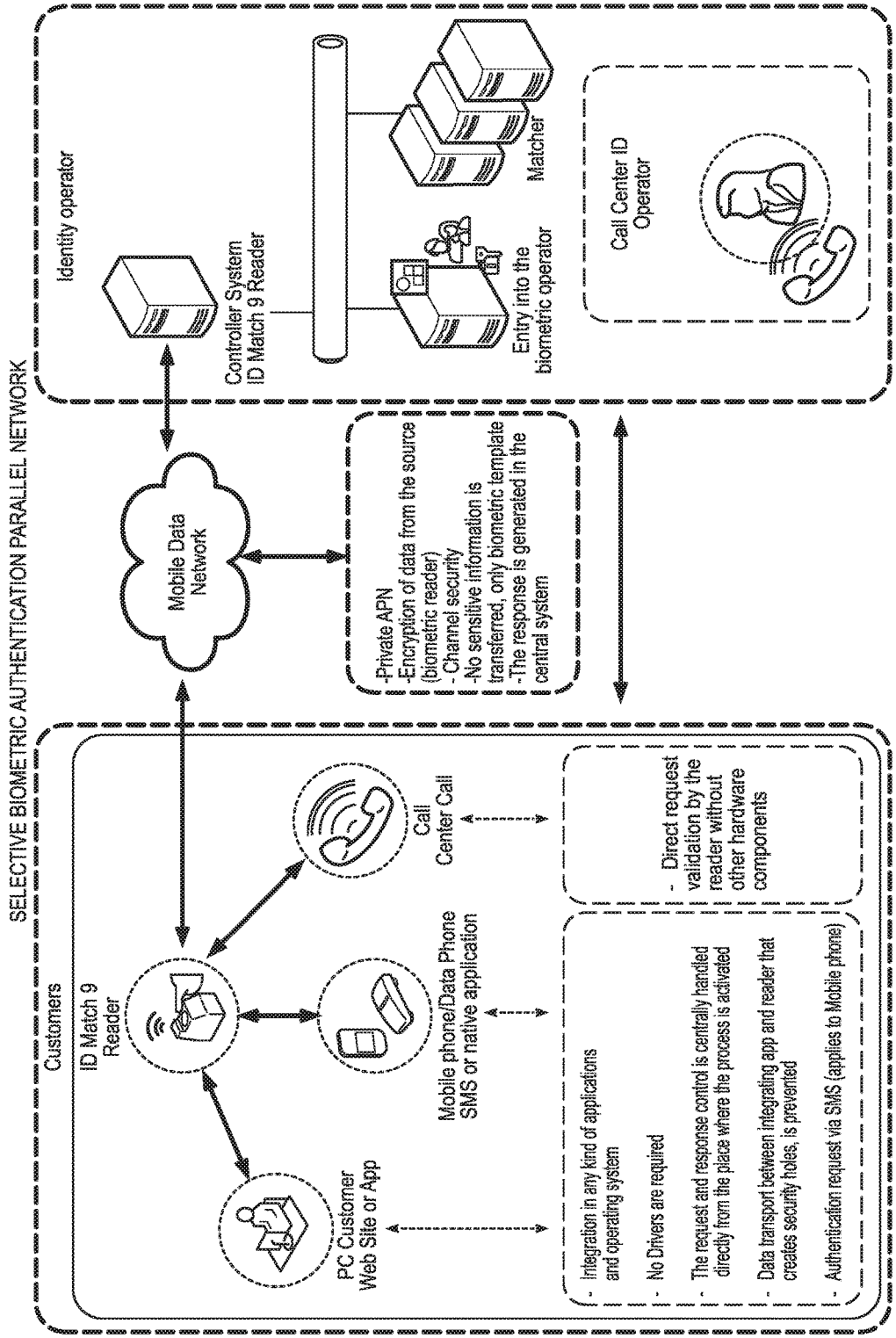
FIG. 5. Diagram of three examples showing different kinds of biometrics provided to any applications that require remote authentication.

Activation can be made by means of multiple platforms (Web service, SMS, Call center, Web portal or any means that can centrally "place" the request, regardless of who makes the request or its hardware or software; see FIG. 2 that refers to the algorithm and FIG. 5 that shows the process) and the following actions take place at this stage;

1. Request is made to the central system, informing the ID number of the customer to be validated (a) and the number of the fingerprint capture and encryption device to be activated (b).

2. Validate the operating conditions required (status of biometric reader, status of network, registration, verification of customer, etc.), activate the fingerprint capture and encryption device by order issued from the central system, and initiate the process to capture and encrypt the fingerprints of the subject to be authenticated.

3. Activate the fingerprint capture and encryption device and capture the fingerprints of the customer being validated, which fingerprints are codified, encrypted and transferred directly from the biometric reader to the central system.

4. Centrally receive the information of the fingerprint, decode the information and send the validation request to the biometric matcher system to be compared with the reference fingerprints of the subject.

5. Return the answer to the customer through the application or interphase that originally requested the transaction.

More preferably, this invention refers to a parallel network of biometrical terminals; centrally controlled in a selective way. Each biometrical Terminal is linked or "matched" according to a previous assignment and distribution of operation to the electronic device or process that requires the respective biometrical authentication.

In this case, the devices or processes that require the biometrical authentication are given by the type of transaction or process, in preferred embodiments; the transaction may be monetary, taking the request from data-phone, cashier, computer, etc., that has the numerical matching of the capture device, to the center that orders the device to start the process of fingerprint capture and encryption.

This invention is characterized by the fact it preferably uses a parallel network of biometrical terminals, centrally controlled in a selective way. This network is in charge of activating the corresponding biometrical Terminal, to provide devices or processes with biometrical validation as required, with no need of specific interphases or integrations.

In a preferred embodiment, the invention does not require any hardware or software intervention to be attached to the requiring device, since it works on line with the center databases. The central system provides the positive or negative "Hit/No-Hit" input as a result of the biometrical authentication, so the process or device that requested the service may continue with its operation after obtaining the biometrical authentication provided.

The invention has the additional advantage of not requiring specific developments or precise technical knowledge from each customer in need for the biometrical validation. The validation is made controlling the fingerprint capture and encryption device (FIGS. 3 and 4) in a centralized way. This center activates the fingerprint capture and encryption device by simple activation that individually references each IDMatch9 device, linked to the serial number that identifies the same.

For the present invention, management Center is understood as the Hardware and Software infrastructure in charge of processing all requests of authentication of customers. The term "Center" refers to a place where the authentication requests are received and afterwards it orders the activation of the respective IDMatch9 device of the NETWORK.

In a preferred embodiment, the request storing substation may be in the form of a Call Center that receives requests of identity authentication, and from which authentication requests are made to the "Management Center" by a manual (Web portal) or an automatic (Web Service) process.

The "fingerprint capture and encryption device" is such device designed and preferably is IdMatch9, which captures, encrypts and sends the signal to the management center.

The "Fingerprint Template" (FIG. 1) is the numerical representation (with a size considered between 100 and 400 Bytes of length) that represents position and direction features of each fingerprint mark (Coordinate "X", Coordinate "Y" and angle thereof) formed by the terminations and bifurcations of crests and valleys that show the image of the fingerprint. Template refers to the "Map" of the landmarks of the fingerprint.

"Matcher" refers to the algorithm that compares Templates with the purpose of determining if they either belong or not to the claimed fingerprint. The comparison of templates is a process of overlaying maps of featuring points that determine if they either correspond or not to the same fingerprint. It considers the difference between maps of featuring points due to variations in Translation, Rotation and Scale.

The "Hit/No hit" action is the result obtained from the Matcher in the process of confrontation of two Templates. "Hit" is the answer of acceptance of the Authentication and "No Hit" is the rejection of the same.

"Biographical information" is understood as the Last Names and Names of the person being consulted in the database. Usually, the Biographical information is delivered after obtaining a "Hit" in the process of comparison of templates.

"Biometric information" refers to information of physiological characteristics that can be measured and represent a subject establishing a specific Pattern of identification with a high degree of individualization. In the case of the Biometry of Fingerprints, Biometric information refers to templates of the fingerprints.

Reference Database is usually understood as the enlisting or incorporation processes that store the templates (Biometric information) and the last names and names (Biographical Information) in certain databases, Said Database constitutes the Data Base of Reference in authentication processes:

In this document, the Parallel Network is the process of communicating the information. It was defined as such, since each request of authentication is linked to a single fingerprint capture and encryption device for authentication.

Uniqueness is the quality of being Unique. In fingerprint Biometrics, fingerprints and their templates provide such condition.

The "AFIS System" is understood as an information system based on fingerprints, which has the primary characteristic is that no individual stored in this system can be repeated. The feature of individuality of each record is granted by having compared the fingerprints of each individual with the others. The "No Hit" result in all comparisons ensures the individuality and authorizes the incorporation of the new registry into the Database.

The invention is oriented and has the advantage to easily provide Biometry to any process or device that can "place" the request centrally, regardless of who makes such request, or its hardware or software.

This invention does not require any drivers, controllers or software in the customer's system, as it takes advantage of the operation of the center connected to a wireless network, Wi-Fi or Internet with a fingerprint capture and encryption device designed for that purpose to be activated. The biometrical capture is completely independent and centrally controlled.

The present invention does not require specialized personnel for each one the systems making the request, as the simple procedure of the fingerprint capture and encryption device Terminal allows being activated upon petition.

The present invention discloses a concept of standard installation and does not require specific knowledge of each hardware or software manufacturer that desires using the biometrical authentication system.

On the other hand, the model of operation of the parallel network of biometrical authentication provides the capacity of integrating directly the biometry to multiple devices or processes without any additional efforts of development or requirements of integration with other software platforms or specific hardware.

The following specific embodiments disclose a better interpretation of the invention and shall not be understood as a limitation of the scope thereof.

EXAMPLE 1

Payment by Data-Phone

Figure 6:
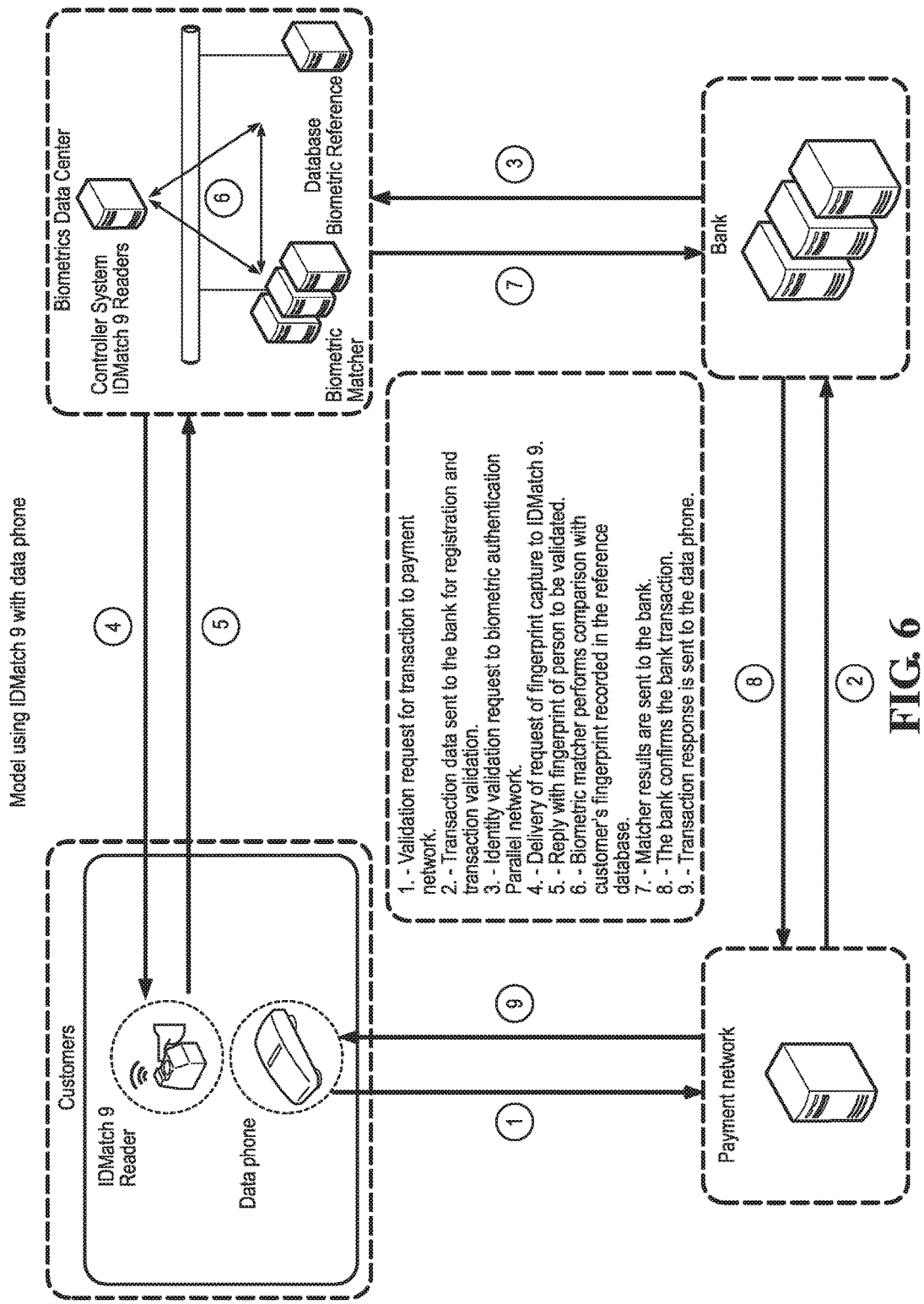
FIG. 6. Diagram of use of parallel authentication network for biometrical authentication using data phone.

The numbers correspond to those disclosed in FIG. 6.
1) The commercial establishment receives the card (debit or credit) from client or the required banking information. The employee from the establishment introduces the card and enters the value of the transaction. The client enters the key.
2) The transaction request is transmitted for authorization from the hank.
3) The banking center sends the card data, with the identification number of the person to the authorization center.
4) The authorization center asks to the biometrical network for activation of the fingerprint capture and encryption device that is "matched" with the data-phone,
5) The activation of the fingerprint capture and encryption device is started remotely and the fingerprint is captured, encrypted and transmitted in order to process the centralized validation.
6) The process of centralized validation begins where it is compared with templates of the reference fingerprints,
7) The result is sent to the banking center to either continue or suspend the transaction.

Further Actions:
1. The authorization is granted or rejected
2. The transfer voucher is signed if the authorization is granted.
3. The card is returned back to customer.

EXAMPLE 2

Authorization for Medical Services

Figure 7:
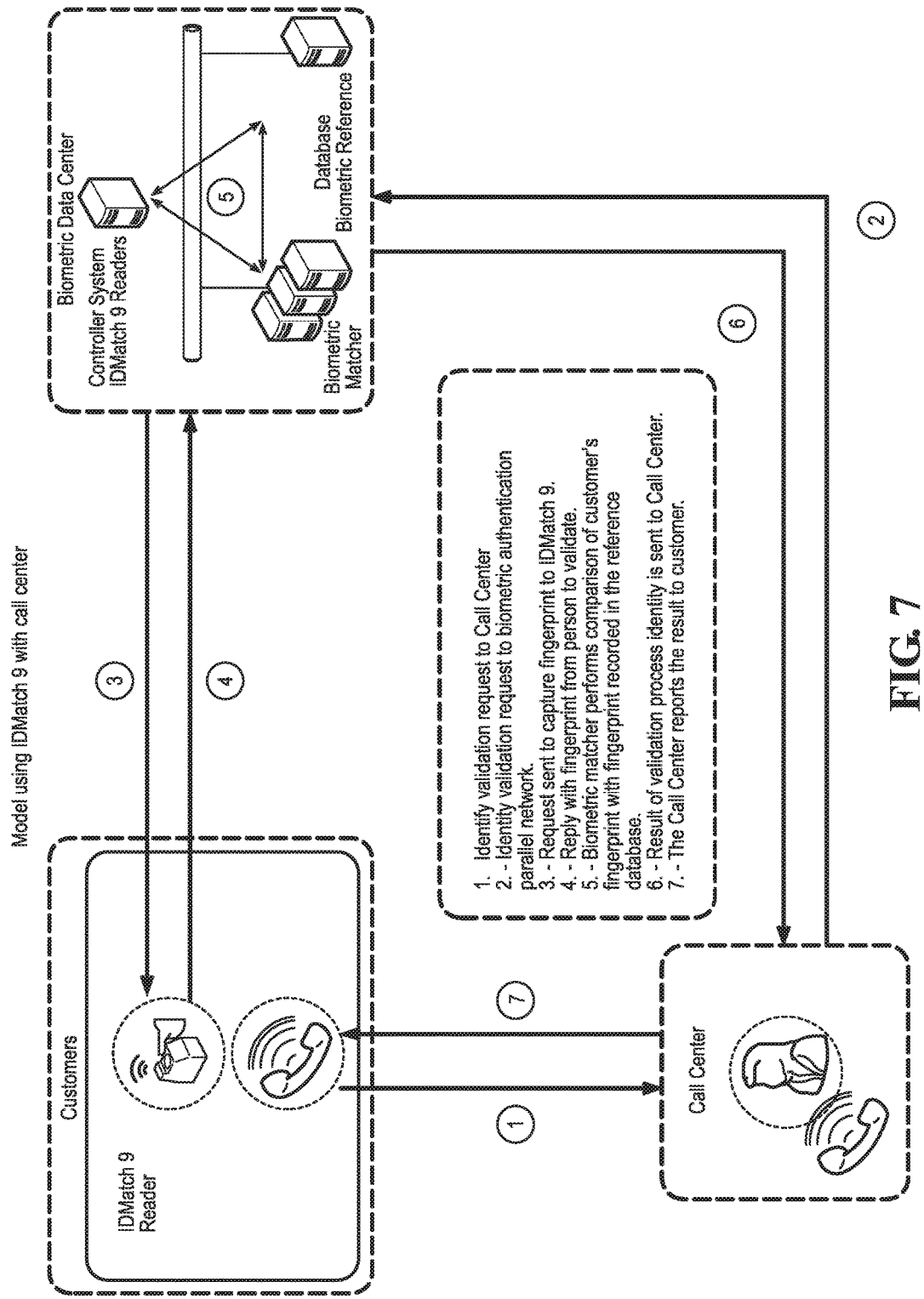
FIG. 7. Diagram of use of parallel authentication network for biometrical authentication using phone communication.
Figure 8:
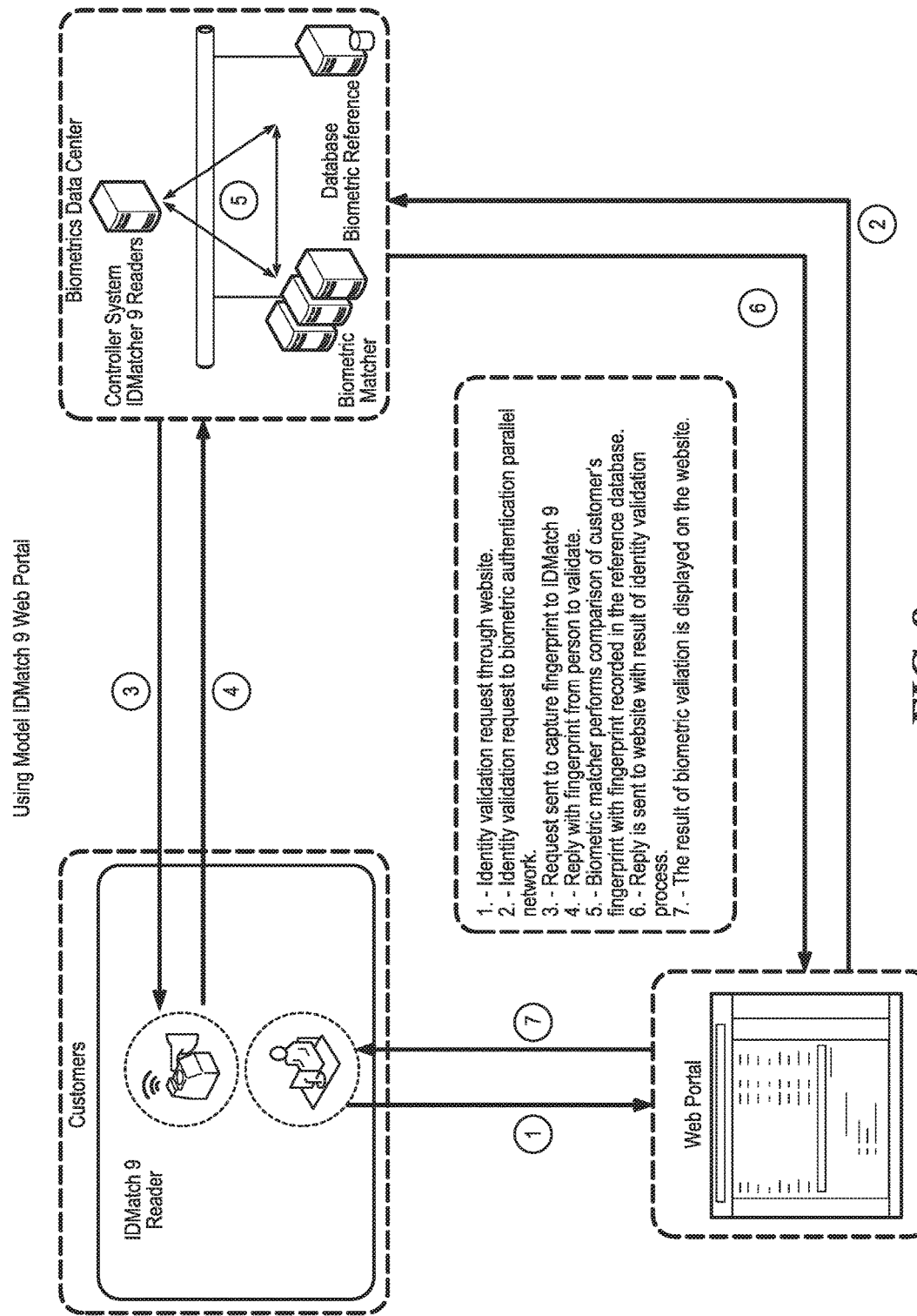
FIG. 8. Diagram of use of parallel authentication network for biometrical authentication using a Web Portal.

Scheme Corresponding to FIG. 7

The coordinating secretary of doctor's offices receives the medical assistance company affiliation card of the patient held by the same.

The secretary makes a phone call to the biometrical authentication center, which is attended via IVR (Interactive Voice Recognition) or by means of the operator from the respective call center (item 1).

The center is informed (item 2) by typing or telling the ID number of the patient for validation, as well as the serial number of the fingerprint capture and encryption device (this step could be avoided if the center relates this number with the telephone number from which the call is made).

The fingerprint capture and encryption device to be validated is remotely activated (item 3) and the fingerprint is captured, encrypted and transmitted (item 4) to the centralized validation process where the template is compared (item 5) with the reference fingerprints, communicating the result (item 6) of such validation to the person making the call to authorize the service or to suspend the same (numeral 7).

EXAMPLE 3

Personal Delivery of Merchandise at Home

The messenger in charge of delivery of specific merchandise arrives to his addressee and consults through his mobile phone the identification of the package recipient.

The messenger sends by SMS the "IDCOD" number and the "NUMCEDULA" (ID) number associated to the request reception center of the biometrical authentication Parallel network (associated number). The IDCOD is the code of the IDMAtch9 to be activated, the "NUMCEDULA" (ID) is ID Card number of the person to receive the merchandise.

The central that controls the fingerprint capture and encryption devices receives the activation message and starts it remotely. The fingerprint is captured, encrypted and transmitted to the centralized validation process where it is compared with the reference fingerprints, communicating the result of this validation to whom is making the request via SMS, confirming the identity of the package recipient.

The package is delivered with assurance of the recipient identity.

The invention claimed is:
1. A method of biometric authentication comprising the following steps:
   i) sending an authentication request from a user device to a central system that comprises a single code that uniquely identifies a fingerprint capture and encryption device, and a personal identification number (PIN) of a person to be authenticated;
   ii) selectively activating the fingerprint capture and encryption device uniquely associated with the single code, by the central system, based upon the authentication request;
   iii) capturing and encrypting fingerprint data of the person to be authenticated using the fingerprint capture and encryption device;
   iv) transferring the encrypted fingerprint data from the fingerprint capture and encryption device to the central system,
   wherein the central system verifies that the PIN sent in the authentication request matches the PIN of the person to be authenticated by decrypting and comparing the encrypted fingerprint data to at least one reference fingerprint profile stored in a corresponding database; and
   v) authorizing a service provider to provide a requested service to the person being authenticated upon verifying of the authentication request.
2. The method of biometric authentication of claim 1, wherein the central system authorizes the service provider to provide the requested service by telephone, via the Internet, or by text message.
3. The method of biometric authentication of claim 1, wherein the corresponding database comprises a public or private database.
4. The method of biometric authentication of claim 1, wherein the fingerprint capture and encryption device is configured to be remotely managed by a software program executed at the central system.
5. The method of biometric authentication of claim 4, wherein the software program executed at the central system is configured to control the selective activation of the fingerprint capture and encryption device.

6. The method of biometric authentication of claim 5, wherein the corresponding database comprises one or more reference fingerprint profiles associated with one or more user PINs.

7. The method of biometric authentication of claim 5, wherein the corresponding database is stored at the central system.

8. The method of biometric authentication procedure of claim 1, wherein the fingerprint capture and encryption device is configured to be activated by the central system and to transfer the encrypted fingerprint data to the central system using a first network that is independent from a second network used to communicate the authentication request.

9. The method of biometric authentication of claim 1, wherein the user device is a mobile phone and the fingerprint capture and encryption device is configured to wirelessly communicate with the mobile phone.

10. The method of biometric authentication of claim 9, wherein the central system communicates activation of the fingerprint capture and encryption device through a wireless connection established between the fingerprint capture and encryption device and the mobile phone.

11. The method of biometric authentication of claim 1, further comprising a step of establishing a wireless connection between the user device and the fingerprint capture and encryption device prior to sending the authentication request from the user device to the central system, wherein the wireless connection is used to communicate the authentication request and activate the fingerprint capture and encryption device.

\* \* \* \* \*